(12) United States Patent
Dutil et al.

(10) Patent No.: US 9,394,977 B2
(45) Date of Patent: Jul. 19, 2016

(54) TENSIONER WITH EXPANDING SPRING FOR RADIAL FRICTIONAL ASYMMETRIC DAMPING

(71) Applicants: Kevin Gerard Dutil, Bentonville, AR (US); Anthony Eugene Lannutti, Fayetteville, AR (US)

(72) Inventors: Kevin Gerard Dutil, Bentonville, AR (US); Anthony Eugene Lannutti, Fayetteville, AR (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 454 days.

(21) Appl. No.: 13/834,989

(22) Filed: Mar. 15, 2013

(65) Prior Publication Data

US 2014/0274510 A1   Sep. 18, 2014

(51) Int. Cl.
*F16H 7/12* (2006.01)
*F16H 7/08* (2006.01)

(52) U.S. Cl.
CPC ........ *F16H 7/1218* (2013.01); *F16H 2007/081* (2013.01); *F16H 2007/084* (2013.01); *F16H 2007/0893* (2013.01)

(58) Field of Classification Search
CPC .................................................... F16H 7/1209
See application file for complete search history.

(56) References Cited

U.S. PATENT DOCUMENTS

| 4,473,362 A | 9/1984 | Thomey et al. |
| 4,479,461 A | 10/1984 | Felice et al. |
| 4,661,087 A | 4/1987 | Henderson |
| 4,971,589 A | 11/1990 | Sidwell et al. |
| 5,169,368 A | 12/1992 | Quintus et al. |
| 5,370,585 A | 12/1994 | Thomey et al. |
| 5,411,122 A | 5/1995 | Uphaus |
| 5,470,280 A | 11/1995 | Ayukawa |
| 5,632,697 A | 5/1997 | Serkh |
| 5,772,549 A | 6/1998 | Berndt et al. |
| 5,964,674 A | 10/1999 | Serkh et al. |
| 5,967,919 A | 10/1999 | Bakker |
| 6,264,578 B1 * | 7/2001 | Ayukawa ...................... 474/135 |
| 6,458,055 B1 | 10/2002 | Bellamy-Booth |

(Continued)

FOREIGN PATENT DOCUMENTS

| CN | 201531571 | 7/2010 |
| WO | 2004/033933 | 4/2004 |

(Continued)

OTHER PUBLICATIONS

PCT, International Search Report and Written Opinion, PCT/US2014/017709 (Jun. 6, 2014).

*Primary Examiner* — Michael Mansen
*Assistant Examiner* — Mark K Buse
(74) *Attorney, Agent, or Firm* — Thompson Hine LLP (57) ABSTRACT

A tensioner is disclosed that may be part of a power system where the tensioner provides tension to an endless power transmitting element such as a belt, chain, or other continuous loop. The tensioner has an arm that is rotatable about a first axis and includes an arm arbor having a window therethrough, a bushing having a protrusion and being positioned adjacent the arm arbor with the protrusion received in the arm arbor's window, and a spring coupled to the arm urging the arm to rotate about the first axis into tensioning engagement with a power transmitting element. The spring is positioned where it can radially expand into contact with the protrusion of the bushing as the arm is rotated in a direction opposite the direction of tensioning engagement such that the bushing is urged radially outward relative to the arm arbor to provide frictional damping.

16 Claims, 7 Drawing Sheets

(56) References Cited

U.S. PATENT DOCUMENTS

| | | |
|---|---|---|
| 6,464,604 B1 | 10/2002 | Frankowski et al. |
| 6,565,468 B2 | 5/2003 | Serkh |
| 6,575,860 B2 | 6/2003 | Dutil |
| 6,582,332 B2 | 6/2003 | Serkh |
| 6,609,988 B1 | 8/2003 | Liu et al. |
| 7,004,863 B2 | 2/2006 | Serkh et al. |
| 7,104,909 B2 | 9/2006 | Asbeck et al. |
| 7,448,974 B2 | 11/2008 | Crist et al. |
| 7,467,569 B2 | 12/2008 | Wang |
| 7,594,869 B2 | 9/2009 | Holmes |
| 7,678,002 B2 | 3/2010 | Joslyn |
| 7,803,078 B2 | 9/2010 | D'Silva et al. |
| 8,075,433 B2 | 12/2011 | Quintus et al. |
| 8,142,314 B2 | 3/2012 | Antchak et al. |
| 8,142,315 B2 | 3/2012 | Dell |
| 2006/0079360 A1 | 4/2006 | Jung et al. |
| 2006/0100049 A1 | 5/2006 | Lannutti et al. |
| 2008/0176687 A1 | 7/2008 | Schever |
| 2008/0194366 A1 | 8/2008 | Mevissen et al. |
| 2009/0054186 A1 | 2/2009 | Stegelmann et al. |
| 2009/0131208 A1 | 5/2009 | Hawryluck et al. |
| 2009/0181815 A1 | 7/2009 | Guhr |
| 2009/0275432 A1 | 11/2009 | Dell |
| 2010/0137084 A1 | 6/2010 | Mevissen et al. |
| 2010/0184546 A1 | 7/2010 | Singer |
| 2010/0234155 A1 | 9/2010 | Antchak et al. |
| 2011/0015017 A1 | 1/2011 | Serkh |
| 2012/0004059 A1 | 1/2012 | Ma et al. |
| 2012/0058847 A1* | 3/2012 | Ferguson et al. .............. 474/135 |
| 2012/0058848 A1* | 3/2012 | Lannutti et al. ............... 474/135 |

FOREIGN PATENT DOCUMENTS

| | | |
|---|---|---|
| WO | 2006/052552 | 5/2006 |
| WO | 2007/106971 | 9/2007 |
| WO | 2010/037232 | 4/2010 |

\* cited by examiner

Spring rate variation based on spring support position

TENSIONER WITH EXPANDING SPRING FOR RADIAL FRICTIONAL ASYMMETRIC DAMPING

TECHNICAL FIELD

The present invention relates generally to tensioners and more particularly to an asymmetrically damped tensioner utilizing an expanding spring to provide radial friction-damping.

BACKGROUND

It is common for a tensioner such as a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Accessory drive systems have benefited from the use of asymmetric damping to address this problem. An asymmetrically damped tensioner provides damping when additional belt tension is encountered, but is free to respond to slack belt conditions. Although asymmetric functionality may not be required for all other front end accessory drive tensioners, the potential for increased service life, solving other transient dynamic system problems including belt slip, or simply making the tensioner less sensitive to damping variation make it a desirable design option.

Many belt tensioner damping mechanisms that utilize frictional damping use axial forces to move components of the tensioner to create the frictional force that does the damping. These designs tend to require a means to contain the axial force and some components of the belt tensioner must be more robust to withstand the axial force over the lifetime of the tensioner.

SUMMARY

One aspect of the disclosed tensioners is a tensioner embodiment where the radial damping force can be contained within a support wall rather than relying on joints. The radial damping is preferably asymmetric.

In one embodiment, a tensioner is disclosed that may be part of a power system where the tensioner provides tension to an endless power transmitting element such as a belt, chain, or other continuous loop. The tensioner has an arm that is rotatable about a first axis and includes an arm arbor having a window therethrough, a bushing having a protrusion wherein the bushing includes a longitudinal slit that allows radial expansion and splits the protrusion into a first part and a second part and being positioned adjacent the arm arbor with the protrusion received in the arm arbor's window, and a spring coupled to the arm urging the arm to rotate about the first axis into tensioning engagement with a power transmitting element. The spring is positioned where it can radially expand into contact with the protrusion of the bushing as the arm is rotated in a direction opposite the direction of tensioning engagement such that the bushing is urged radially outward relative to the arm arbor to provide frictional damping.

In another embodiment, the tensioner includes a support member housing the spring, the arm arbor, and the bushing with the bushing adjacent the support member and the arm arbor between the spring and the bushing. Accordingly, when the spring is expanded radially it urges the bushing into frictional engagement with the support member to provide the frictional damping.

In one embodiment, the bushing includes a substantially cylindrical sleeve that has at least one protrusion on its inner surface and a longitudinal slit that splits the protrusion into two parts. The bushing may also have a flange extending outward from one end of its sleeve.

The arm arbor of the arm preferably has a fixed diameter such that the arm arbor does not respond to the radial expansion of the spring. Instead, just the bushing is expanded radially by the expanding spring. The tensioner may also include a cap enclosing the spring within the tensioner.

In one embodiment, the arm includes a pulley rotatably mounted about a second axis, the second axis being spaced from and parallel to the first axis.

In another embodiment, a tensioner is disclosed that may be part of a power system where the tensioner provides tension to an endless power transmitting element. The tensioner includes a support member comprising a shaft defining a first axis, an arm comprising an arm arbor mounted on the shaft for rotatable movement of the arm about the first axis. The arm arbor defines a cavity that has at least one window opening therein. The tensioner also includes a bushing between the support member and the arm. The bushing includes a protrusion wherein the bushing includes a longitudinal slit that allows radial expansion and splits the protrusion into two parts. Additionally, the tensioner has a spring received in the cavity of the arm arbor and coupled to the arm. The spring urges or biases the arm to rotate about the first axis into tensioning engagement with a power transmitting element. The spring is also positioned to radially expand into contact with the protrusion of the bushing as the arm is rotated in a direction opposite the direction of tensioning engagement such that the bushing is urged radially outward relative to the arm arbor into frictional engagement with the support member to provide frictional damping.

DETAILED DESCRIPTION

The following detailed description will illustrate the general principles of the invention, examples of which are additionally illustrated in the accompanying drawings. In the drawings, like reference numbers indicate identical or functionally similar elements.

The damping mechanism and tensioner disclosed herein provide an asymmetric frictional damper. The tensioner is typically part of a power system where the tensioner provides tension to an endless power transmitting element such as a belt, chain, or other continuous loop that are in a system driven by at least one source and that may also drive an accessory. The power transmitting element and the tensioner operate in concert with the tensioner providing tension to the endless power transmitting element as needed and responding to dynamic conditions thereof.

Figure 1:
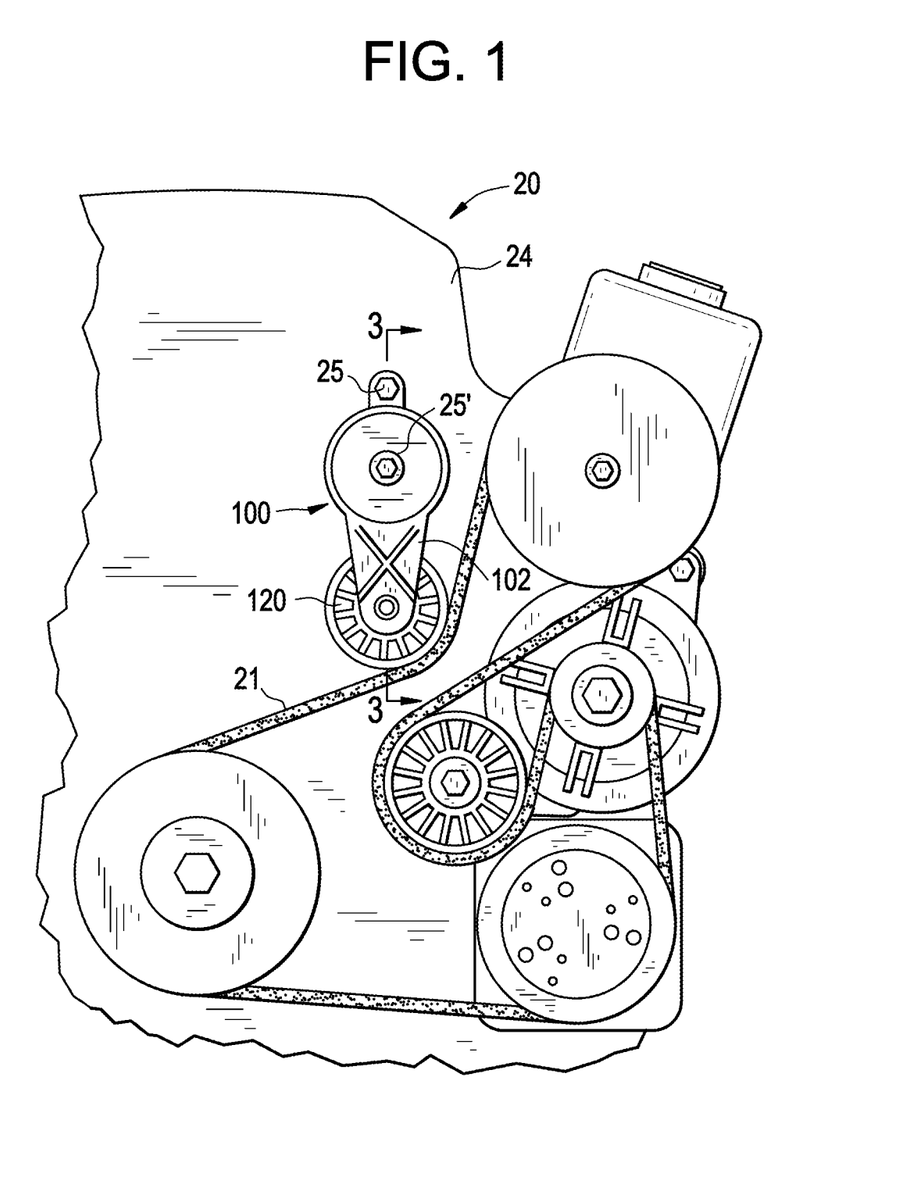
FIG. 1 is a front view of an engine which utilizes an embodiment of a tensioner.

Referring now to FIG. 1, an engine is generally indicated by the reference numeral 20 and utilizes an endless power transmitting element 21 for driving a plurality of driven accessories as is well known in the art. The belt tensioner of this invention, generally designated as 100, is utilized to provide a tensioning force on the endless power transmitting element 21. The endless power transmission element 21 may be of any suitable type known in the art. The tensioner 100 is configured to be fixed to a mounting bracket or support structure 24 of the engine 20 by a plurality of fasteners 25. The fasteners may be bolts, screws, welds, or any other suitable fastener known in the art that will hold the tensioner in place during operation of the engine. The mounting bracket or supporting structure 24 may be of any configuration and include any number of openings for receiving the fasteners 25.

Tensioning a slack endless power transmitting element with the tensioner disclosed herein is unusual in that it is the winding of an unwound spring that operates to rotate the arm of the tensioner to provide tension, which will be referred to herein as the tensioning direction T. In the opposite direction, referred to herein as the winding direction W, the tensioner arm may be considered to be winding in response to a prevailing force of the endless power transmitting element which is tightening in the span where the tensioner resides; however, uncharacteristically for tensioners, the winding of the tensioner arm corresponds to an unwinding of the spring within the disclosed tensioners.

The winding of the tensioner may have some potentially undesirable effects upon the drive system's intended function. To mitigate these undesirable effects it may be helpful to have a damper or damping mechanism, for example a frictional damper, incorporated in the tensioner to resist the movement of the power transmitting element, without adversely affecting rotation of the tensioner, in particular its arm to tension the power transmitting element. This kind of frictional damping is generally known as asymmetric damping, and in the tensioners disclosed herein the unwinding of the spring provides such damping. The unwinding of the spring expands its coils outward, enlarging its coil diameter, which is herein utilized to provide the asymmetric friction damping by having the spring act upon another component of the tensioner in that the spring urges into frictional engagement with another surface.

Figure 2:
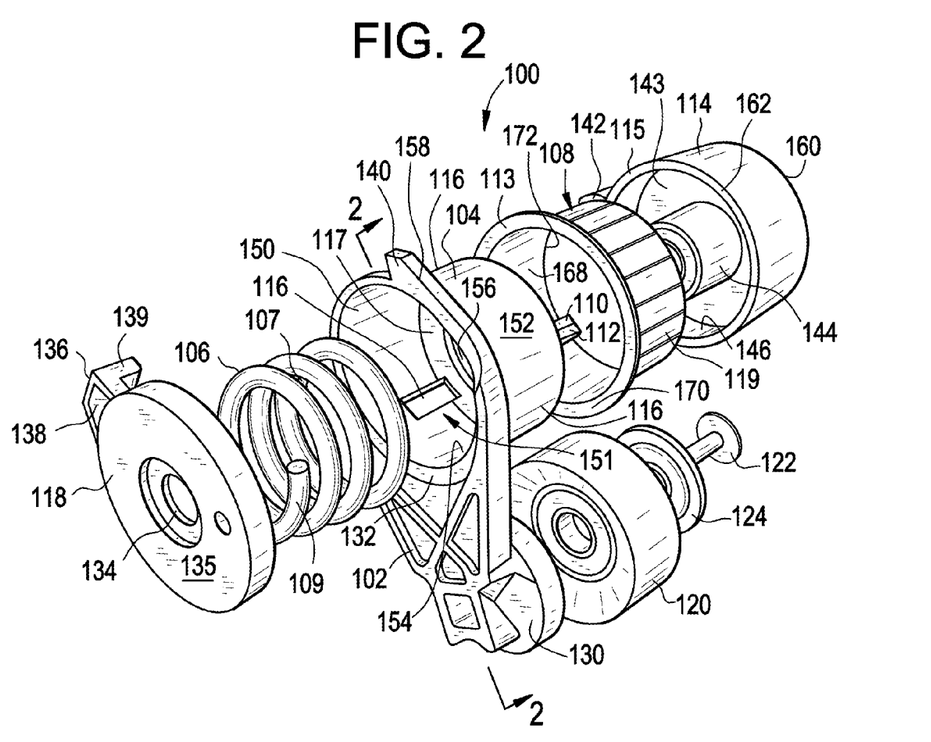
FIG. 2 is an exploded perspective view of an embodiment of a tensioner.
Figure 3:
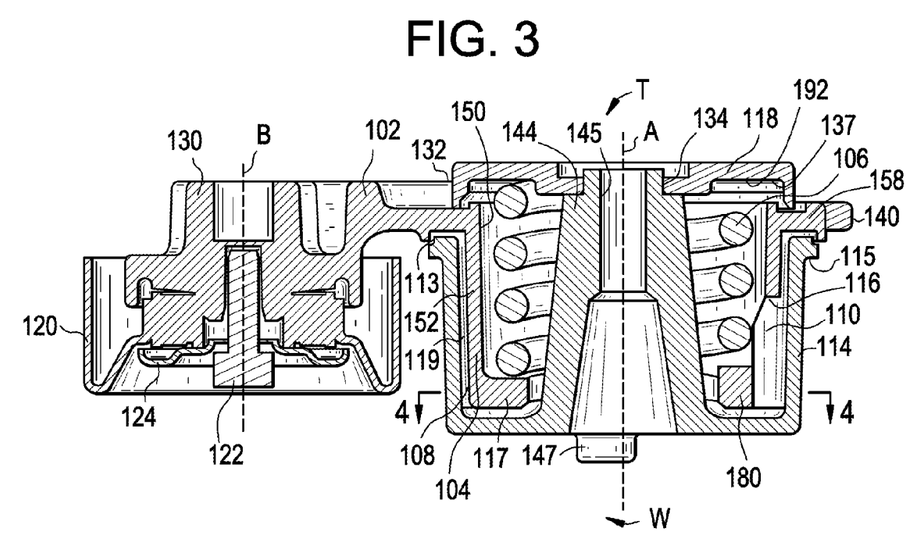
FIG. 3 is a side, cross-sectional view of the tensioner of FIG. 1 taken along line 3-3.

Referring to FIGS. 2-3, the tensioner 100 provides asymmetric frictional damping to the movement of an arm 102 through the expansion of spring 106 as it is unwound in response to a belt load or other prevailing force of the endless power transmitting element which is tightening in the span where the tensioner resides. The spring 106 transfers an outwardly directed force, a radial force, from its expanding coils to a bushing 108 to urge the bushing 108 into frictional engagement with an interior surface 146 of a support member 114 that houses at least part of the spring 106 and bushing 108 such that substantial frictional damping is applied to the belt tensioner in the winding direction W. As explained above, the winding direction occurs when increasing tension causes the endless power transmitting element to lift the tensioner arm in a direction away therefrom. The tensioner resists rotating in the winding direction W with a frictional damping force, but does not substantially resist movement of the tensioner arm toward the belt with the same frictional damping force.

Unique to the construction of the tensioners disclosed herein is the use of the radially expanding spring where the radial expansion provides the force to urge parts into frictional engagement to provide damping and the radially expanded, i.e., unwound, spring then applies a torsional force to apply torque to the tensioner arm to rotate the tensioner arm in the tensioning direction T, i.e., toward the power transmitting element.

The tensioner's application of radial force, rather than axial force, allows some of the components to be made from less costly materials as the components and joints do not need to be as robust as they would to withstand axial forces. The absence of axial forces allows some components to be made thinner, which can reduce the weight of the tensioner and the cost. Any radial forces that exist in the tensioner can be contained effortlessly within the support member of the belt tensioner. While these benefits are realized from the use of radial force, these benefits do not require the absence of axial force. In some embodiments, such as high offset tensioners, axial force can still be present while the damping mechanism operates radially.

As labeled in FIG. 3, the tensioner 100 includes a tensioner arm 102 rotatable about a first axis A in the tensioning direction T and in the winding direction W opposite the tensioning direction as shown in FIG. 3, a spring 106, a bushing 108, a support member 114, and a cap 118. The arm 102 includes a pulley 120 rotatably mounted to its first end 130 for rotation about a second axis B that is spaced from and parallel to the first axis A. The pulley 120 may be coupled to the arm 102 with a pulley bolt 122 or other fastener and may include a dust cover 124.

Referring again to FIGS. 2-3, the arm 102 includes, at its second end 132, an arm arbor 104 extending from the arm about the first axis A. The arm arbor 104 may include a sleeve 152 that has an open first end 154 and a partial bottom 117 that defines an open second end 156 that has a smaller opening compared to the first end 154. In one embodiment, the sleeve 152 is generally cylindrical and defines a housing 150 that may receive the spring 106. Within the sleeve 152 a slot 116 is present that extends therethrough, i.e., the slot is open from the exterior surface of the arm arbor 104 into its interior, e.g., into cavity 151 defined by the sleeve. Slot 116 may also be called a window, since it defines an opening that provides a passageway through the side of the sleeve 152 and is bounded on all sides by portions of the sleeve 152. Upon assembly, the first end 154 of the sleeve 152 may be closed by the cap 118 and the second end 156 may be closed by the support member 114. The cap 118 and support member 114 may enclose the other components of the tensioner, for example, the spring 106, the arm arbor 104, and the bushing 108, and protect them from contaminants.

In one embodiment, the slot 116 may extend through the sleeve 152. The slot 116 may be any shape that allows the protrusion 110 of the bushing to extend into the cavity 151 defined by the sleeve 152 for contact with spring 106 as it expands.

As best seen in FIG. 2, the slot 116 may extend through the sleeve 152 and into the partial bottom 117, and as such is bounded on all sides by a portion of the sleeve 152. The portion of the slot 116 in the partial bottom 117 only extends partially radially, inward into the partial bottom 117, such that the partial bottom 117 is circumferentially discontinuous at its outer periphery and circumferentially continuous at its inner periphery. The inner periphery being the edge closest to the first axis A. The circumferentially continuous inner periphery helps stabilize or provide rigidity to the open second end 156 of the sleeve 152 and provides the arm arbor 114 with fixed dimensions. In one embodiment, the sleeve 152 is substantially cylindrical and has a fixed diameter.

Figure 4:
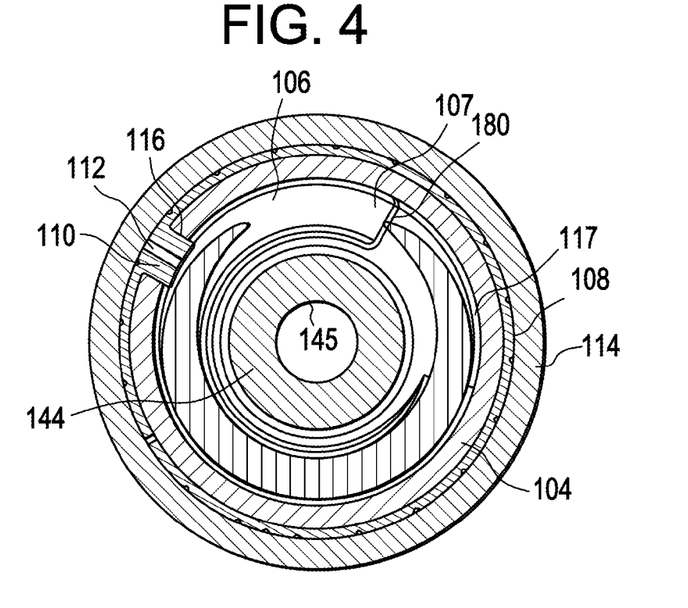
FIG. 4 is a cross-sectional view of the tensioner of FIG. 3 taken along line 4-4.

The partial bottom 117, as best seen in FIG. 4, includes an abutment feature 180 positioned within the interior of the sleeve 152. The abutment feature 180 receives the first end 107 of the spring 106. Accordingly, when the arm arbor 104 rotates with the arm 102, the abutment feature 180 urges the spring 106 to unwind and radially expand its diameter. In one embodiment, the abutment feature 180 is a partition or protrusion that provides a generally planar surface for a generally flat cut end of the spring 106 to abut thereagainst in direct contact.

In another embodiment, the abutment feature 180 is a partition or protrusion having a generally convex shape to receive an end of the spring 106. This construction provides the advantage of allowing for a rougher end cut on the end of the spring. In another embodiment, the abutment feature 180 may be a sleeve, a bracket, a recess, or other receptacle that the spring end 107 fits into to connect the spring to the arm arbor 104 for movement therewith.

In one embodiment, the abutment feature 180 may be a ramping feature, which depending on the ramp direction, could either increase or decrease the outward expansion of the spring. One of skill in the art will appreciate that the shape and/or contour of the abutment feature 180 may be such that the tensioner could have asymmetric or progressive damping.

Referring back to FIGS. 2 and 3, the second end 132 of the arm 102 may also include a flange 158 about the periphery where the arm arbor 104 connects to the arm 102. The flange 158, upon assembly of the tensioner 100, may seat upon flange 115 of the support member 114. Extending from flange 158 there may be a tab 140 projecting outward that may act as a stop to limits the rotational movement of the arm 102 about first axis A when the tab 140 contacts a stop, for example, stop 142 on the support member 114 and/or tab 136 on the cap 118.

The arm arbor 104 is received in the cavity 143 of the support member 114. The support member 114 has a closed end 160 and an open end 162 and includes a pivot shaft 144 that extends from the closed end 160 into the cavity 143 and about which the arm arbor 104 rotates. The support member 114 may facilitate mounting the tensioner 100 in place relative to an endless power transmitting element. In one embodiment, the pivot shaft 144 is generally centrally positioned within the cavity 143 and has an axially extending opening 145 or bore that may receive a bolt, screw, pin, or other fastener 25' (shown in FIG. 1) to hold the assembled belt tensioner together and/or to mount the tensioner to a surface relative to an endless power transmitting element. The support member 114 may also receive and/or house at least part of the bushing 108 and spring 106.

In one embodiment, the support member 114 may include an upper rim 115 or flange extending outward about the periphery of the open end 162 of the cavity 143 and a stop 142 projecting outward from the exterior wall thereof proximate to the open end 162 or as an extension of the flange 115. In one embodiment, the support member 114 may also include a positioning pin 147 on the exterior surface of the closed end 160 of the cavity 143 that is receivable in a receptacle that may be provided on the mounting bracket or supporting structure 24 of the engine 20.

As shown in FIGS. 2-3, a bushing 108 is positioned or positionable between the arm arbor 104 and the interior surface 146 of the support member 114 and is adjacent the exterior surface of the arm arbor 104. The bushing 108 includes a sleeve 119 having a first open end 170 and a second open end 172 and one protrusion 110 extending from the sleeve's interior surface 168 toward the first axis A, and a slit 112 through the bushing that extends from the first open end 170 to the second open end 172. In one embodiment, the sleeve 119 is generally cylindrical. The protrusion 110 matches the slot 116 in the arm arbor 104 such that the bushing 108 is mateable to the arm arbor 104 with the protrusion 110 received in the slot 116. Accordingly, the protrusion 110 is shaped to mate with the slot 116 of the arm arbor 104. The protrusion 110 is also dimensioned such that it extends through the arm arbor 104 into its interior cavity 151 and is accessible to or by the spring 106 as the spring expands upon unwinding.

Figure 7:
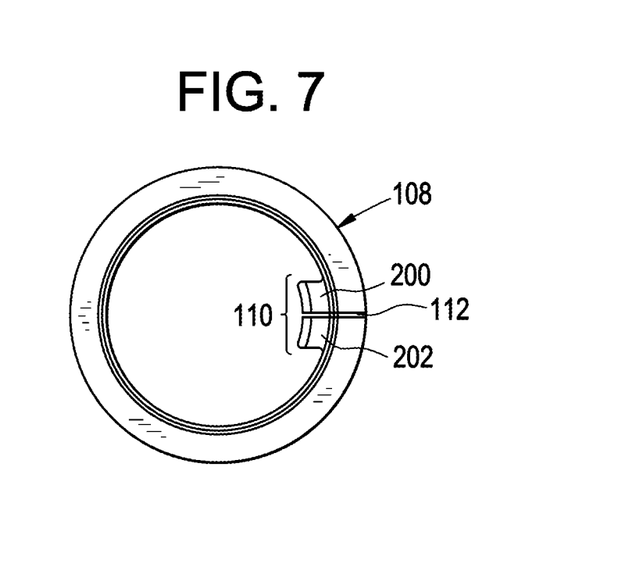
FIG. 7 is a cross sectional view of an embodiment of a bushing with a protrusion split in two parts.

The bushing 108 may also include a flange 113 extending outward from one end of the sleeve 119, for example, from the first open end 170. In the embodiment of FIGS. 2, 3, and 7, the protrusion 110 includes the slit 112 described above. The slit 112 extends the entire length of the protrusion 110 and beyond into the sleeve 119 and flange 113 (if present). The slit 112 splits the protrusion 110 into a first part 200 and a second part 202 and enables the protrusion 110 and the bushing 108 to expand radially in response to the expansion of the spring 106 as it unwinds. In an alternate embodiment, the bushing 108 may be generally elastic.

As seen in FIG. 3, spring 106 is seated within cavity 151 of the arm 102, defined by the sleeve 152, with its coils juxtaposed to the protrusion 110 of the bushing 108. Accordingly, when the arm 102 rotates in response to belt loading or other prevailing force of the endless power transmitting element which is tightening in the span where the tensioner resides, the spring 106 will unwind, increasing the coil diameter, and radially expand its coils into the protrusion 110 of the bushing 108 thereby directing the bushing 108 radially outward relative to the arm arbor 104, which remains stationary with respect to the bushing, and into frictional engagement with the interior surface of the support member 114. As the spring 106 directs protrusion 110 radially outward, the slit 112 causes protrusion 110 to widen within slot 116. As protrusion 110 widens, the first part 200 and the second part 202 separate and engage frictionally with the sides of slot 116, this frictional engagement between the slot 116 and the first and second parts 200 and 202 requires spring 106 to exert a greater force in order to continue directing bushing 108 radially outward. The advantage of the widening protrusion 110 is a damping of the forces exerted by the expanding spring 106 on protrusion 110 of the bushing 108.

When the belt loading or other prevailing force of the power transmitting element dissipates, the torque built up in the spring 106 as a result of its unwound state urges the tensioner arm 102 to rotate in the tensioning direction T as the spring returns to its wound state. As the spring 106 returns to its wound state, the protrusion 110 compresses slit 112 and returns to its original shape. When in its original shape, protrusion 110 is received by slot 116 allowing bushing 108 to contract radially and disengage with the interior surface of the support member 114. Accordingly, the spring 106 is coupled to the tensioner arm 102 such that the spring provides the torque to urge the tensioner arm in the tensioning direction T.

The location of slit 112 in protrusion 110 is significant. The location of a slit in the bushing 108 and/or the placement of the protrusion 110 have the potential to create more asymmetrical damping than is desired for some applications of the belt tensioner. For example, if the slit 112 were located 90 degrees or so from the center of protrusion 110, a 270 degree arc would be created in the bushing. When stroked in a direction that causes the 270 degree section to engage radially with the interior surface of the support member 114, more damping is created in that direction than the other direction. Excessive asymmetric damping produced in this manner is erratic and may be uncontrollable making it undesirable, especially when lower levels of damping are required. By locating slit 112 in the center of protrusion 110, two equal arcs are created on either side of the slit 112 in relation to protrusion 110, and therefore eliminates the ability to create excessive asymmetrical damping.

The spring 106 is a torsional spring of any shape and/or configuration. In one embodiment, the torsional spring is a round-wire spring. In another embodiment, the torsional spring may be a square or rectangular spring or a square or rectangular coil spring. In another embodiment, the torsional spring is a flatwire spring. One of skill in the art will appreciate that to these various torsional springs may require alternate spring end engagement points within the tensioner to provide secure attachments so that the spring winds and unwinds appropriately to bias the arm.

Referring again to FIGS. 2-3, the spring 106 preferably has a first end 107 coupling the spring 106 to the tensioner arm 102, in particular to the arm arbor 104, and a second end 109 coupling the spring 106 to the cap 118. The first end 107 of spring 106, as discussed above, abuts against or is received in a first abutment feature 180 of the tensioner arm 102, best seen in FIG. 4, to couple the tensioner arm 102 to the spring 106 so that rotation of the tensioner arm 102 in the winding direction W unwinds the spring and thereby radially expands the diameter of the spring's coils. Thereafter, the torque of the unwound expanded spring 106 can rotate the tensioner arm 102 in the tensioning direction T to tension a power transmitting element when the force lifting the tensioner arm in the winding direction W is reduced. As the spring 106 uses its torque to rotate the arm 102, the spring 106 winds back toward its original position thereby reducing and/or removing the radial force from the protrusion 110 of the bushing 108 such that reduced or substantially no frictional damping to resist rotation of the tensioner arm toward the belt occurs. The damping of the tensioner 100 is asymmetric.

The second end 109 of spring 106 is likewise abutted against or received in a second abutment feature (item 182 in FIG. 5) located in the cap 118. The second abutment feature in the cap 118 may be the same as or different from the first abutment feature 180. It is preferable that the second end 109 of the spring is stationary, i.e., held stationary by the cap 118, which is stationary relative to the arm 102. Accordingly, the second abutment feature in the cap 118 should be configured to hold the second end 109 of the spring 106 stationary.

The cap 118 of FIGS. 1-3 may include a generally centrally located bore 134 for receiving a fastener 25' such as a bolt, screw, rivet, or other fastener for securing the cap to the tensioner. However, the fastener 25' is optional as there are other means known to one of skill in the art for attaching and/or securing the cap 118 to the tensioner. The bore 134 may be countersunk into the upper surface 135 of the cap to receive the head of the fastener.

The cap 118 may also include a tab 136 extending outward therefrom. The tab 136 may be L-shaped and comprise an arm 138 extending generally horizontally outward from the outer periphery of the cap 118 and a flange 139 generally extending vertically down from the end of the arm 138 opposite the periphery of the cap. On the underside 137 of the cap, a second abutment feature for receiving one end of the spring 106 may be formed therein or thereon. A track 192 may be recessed into the underside 137 of the cap for receiving the spring 106 and may define at least part of the abutment feature and extend away therefrom. The track 192 preferably matches the curvature or shape of the spring 106. In one embodiment, the cap 118 may include more than one tab 136 and the tabs may fix the cap 118 to the arm 102 and/or the support member 114.

Figure 5:
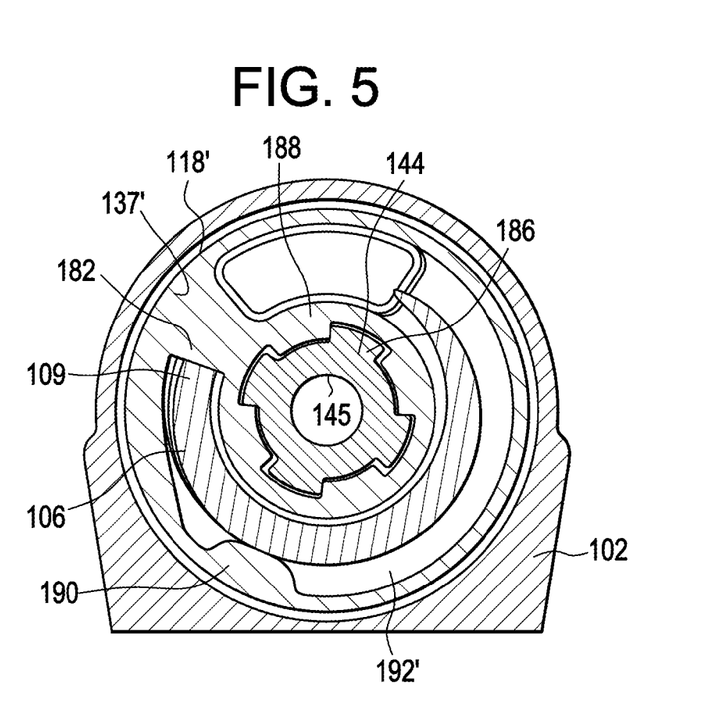
FIG. 5 is a cross-sectional view of an embodiment of a tensioner showing the underside of the cap connected to the arm, pivot shaft, and spring.
Figure 6:
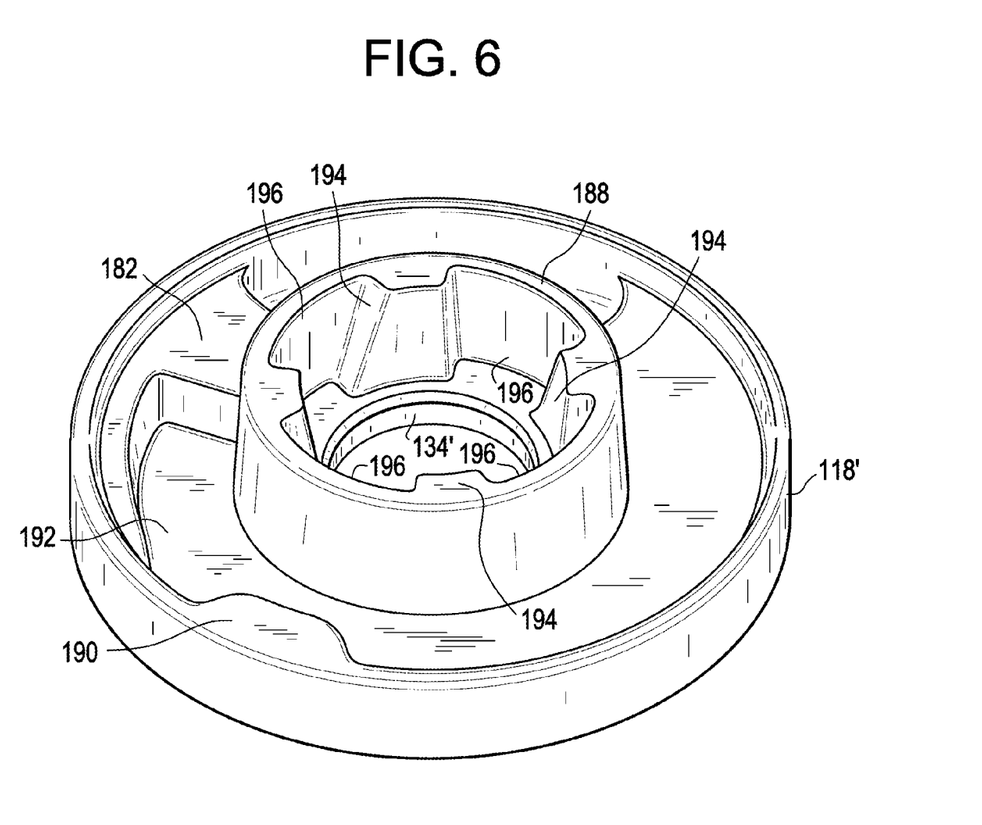
FIG. 6 is a side, bottom perspective view of the cap of FIG. 5.

In another embodiment, illustrated in FIGS. 5-6, the cap, generally designated as 118', has a splined attachment to the pivot shaft 144. The pivot shaft 144 has splined end 186 opposite the pivot shaft's junction to the closed end 160 of the cavity 143 and a bore 145. The splined end 186 provides a mating connection between the support member 114 and cap 118'. To mate with the splined end 186, the cap 118' has a knob 188 comprising an internal configuration of alternating ridges 194 and recesses 196. The cap 118' is held stationary by the knob's 188 connection to the splined end 186 of the pivot shaft 144.

The cap 118' may include a generally centrally located bore 134' that is positioned through the center of the knob 188. The cap 118' may also include a track 192' recessed into the underside 137' thereof. The track 192' is shaped to match the shape of the torsional spring 106, in particular, the portion of the spring that includes the second end 109 of the spring 106 and at least part of the first coil extending therefrom. The track 192' may also define part of the abutment feature 182 against which the cut end of the second end 109 of the spring is in direction contact therewith. The track 192' may have a protrusion 190 extending therein proximal the second end 109 of the spring 106 to aide in maintaining the second end 109 in place in the cap. The second abutment feature 182 may be similar to that described above.

Figure 8:
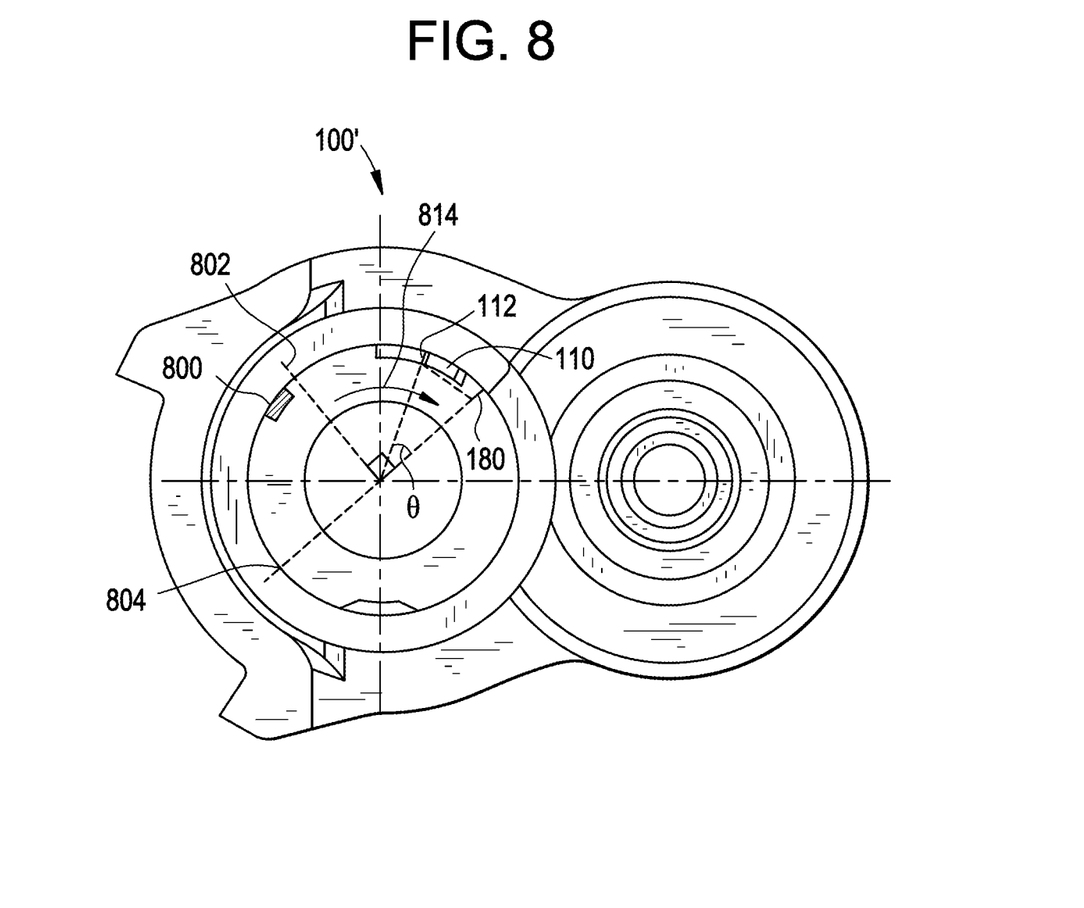
FIG. 8 is a top view of an embodiment of an arm and pivot bushing.

Referring to FIG. 8, an another embodiment of a tensioner, generally designated 100', includes the single protrusion 110 positioned approximately 30 degrees (angle θ) from the first abutment feature 180, preferably measured from the center of the single protrusion 110 at slit 112, and includes a spring support 800 positioned at or between 90 degrees and 180 degrees from the first abutment feature 180. As seen in FIG. 8, these positions are measured in degrees in a counterclockwise direction because the spring will expand as it unwinds into contact with the single protrusion 110 and the spring support 800. If the spring were reversed, then the positions of the single protrusion 110 and the spring support 800 may be the same degree amount but in a clockwise direction from the first abutment feature 180.

The spring support 800 is attached to or is an integral part of the arm arbor 104 and extends from its interior surface into the cavity defined thereby in which spring 106 resides. When the spring 106 is un-wound (i.e., the torque is increased) in the direction represented by arrow 814 it naturally expands radially outward in a direction 90 degrees from the first abutment feature 180. As the spring 106 expands, it will eventually be constrained from further unwinding by contacting the spring support 800. The contact of the spring 106 with the spring support 800 exerts a force on the spring support 800, which is equivalent to the maximum amount of force from the spring. With the spring support 800 present, the single protrusion 110 receives a force from the spring 106 that is less than the maximum amount of force applied to the spring support 800. The position of the spring support 800 affects the amount of force applied to the single protrusion 110 and ultimately the amount of damping provided by the bushing 108. To test this a spring support was placed in seven different positions on the inner surface of the arm arbor separated by 15 degrees as set forth in Table 1 below.

| Position | Degrees from the first abutment feature 180 |
|---|---|
| 1 | 90 |
| 2 | 105 |
| 3 | 120 |
| 4 | 135 |
| 5 | 150 |
| 6 | 165 |
| 7 | 180 |

While the spring abutment 800 was tested in the seven positions listed above, the positions of the spring support 800 are not limited thereto. The spring support 800 may be positioned at a first location 802 which is 90 degrees from the first abutment feature 180, at a second location 804 which is 180 degrees from the first abutment feature 180, or at any single position therebetween whether in increments of degrees, half degrees, or fractions thereof. As the spring support 800 is moved from position 1 through position 7, the spring 106 is able to wedge between the spring support 800 and the single protrusion 110, creating an urging of the spring 106 toward the protrusion 110 and increasing the force on the protrusion which increases the damping output of the tensioner 100', as generally seen in FIG. 9.

Figure 9:
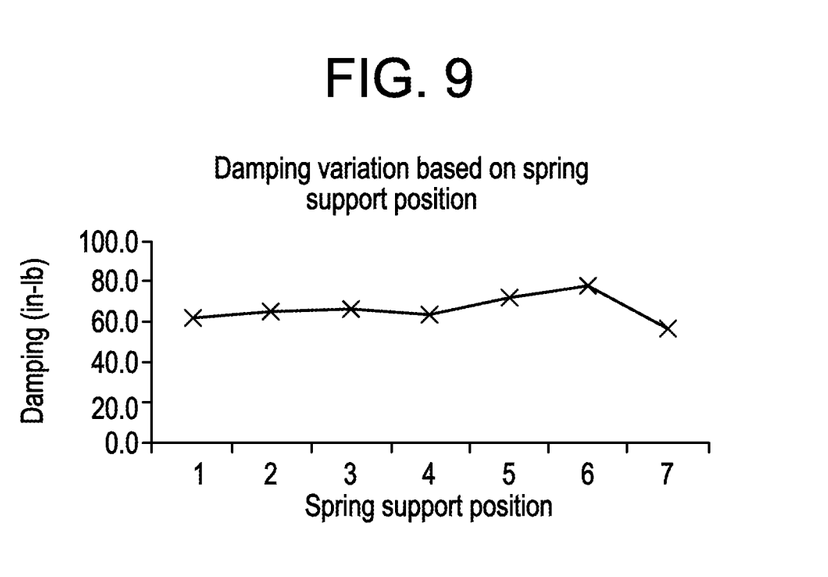
FIG. 9 is a graph showing damping variation based on back-up stop position.
Figure 10:
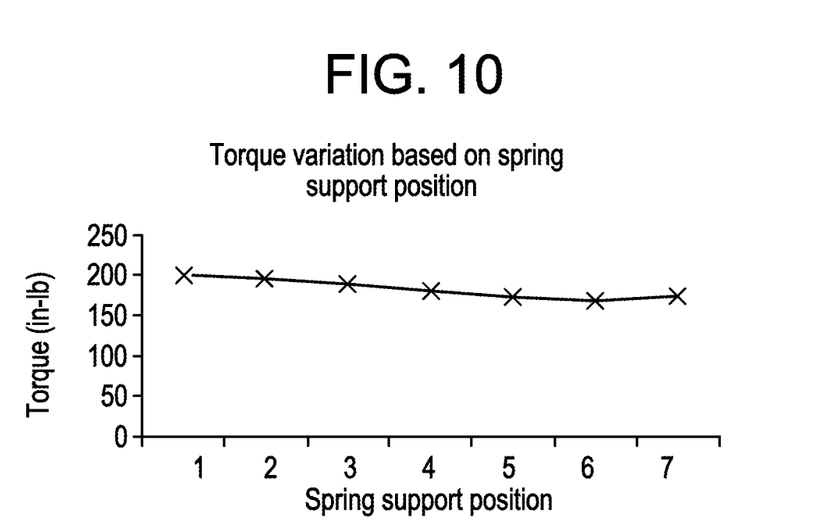
FIG. 10 is a graph showing torque variation based on back-up stop position.
Figure 11:
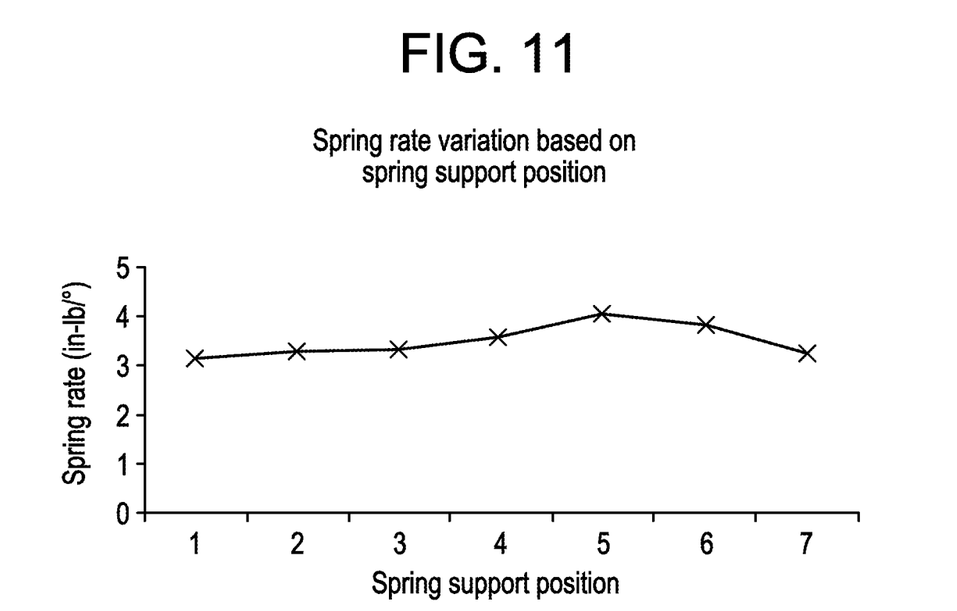
FIG. 11 is a graph showing spring rate variation based on back-up stop position.

The test results are presented in FIGS. 9-11. FIG. 9 is a graph of the change in damping in inch-pounds per position of the spring support 800. Lower amounts of damping, which was one desired object of having a bushing 108 with a single protrusion 110, were achieved in positions 1 through 4 and 7. The lower amount of damping, which is desired, must be evaluated against torque variation and spring rate variation to determine where to place the spring support 800. Looking to FIG. 10, the position of the support spring 800, from position 1 to position 7, decreases the torque of the tensioner. As the position of the support spring 800 becomes a further distance from the protrusion 110, the spring 106 is able to rotate further off the center-line of the tensioner, which affects the torque of the tensioner. The spring rate, shown in FIG. 11, changes with the position of the spring support. The spring rate had a maximum in position 6. Taking all three variable into account and the desire to provide a lower amount of damping, the positions between 90 degrees and 135 degrees, and preferably 90 degrees and 105 degrees are selected. In these position, lower damping is provided as well as a smaller urging of the spring toward the protrusion 110.

The tensioners herein provide a lower and adjustable level of damping. In one embodiment, the tensioner is a high-offset tensioner, sometimes referred to as a "Zed" type tensioner. Here, a radial center plane for the pulley that acts upon the belt is laterally offset from the axis of rotation for a pivot about which the arm of the tensioner oscillates. The axial force present in these Zed tensioners also produces frictional damping through contact with the bushing flange 113. This axial force requires an overall adjustment in the damping within the tensioner, such as reducing the amount of radial damping. Control of the amount of damping for the high-offset tensioner is helpful because in these tensioners a greater amount of axial force is required to counteract the out-of-balance condition produced by the hub load as it is applied to the pulley.

The embodiments of this invention shown in the drawing and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the appended claims.

What is claimed is:

1. A tensioner comprising:
an arm rotatable about a first axis, the arm comprising an arm arbor having a slot through a portion thereof and having a spring support;
a bushing having a protrusion wherein the bushing includes a longitudinal slit that allows radial expansion and splits the protrusion into a first part and a second part;
a spring coupled to the arm urging the arm to rotate about the first axis into tensioning engagement with an endless power transmitting element;
a cap having a spring abutment feature, the cap enclosing the spring within the tensioner;
wherein the bushing surrounds the arm arbor and is positioned with the protrusion extending through the slot of the arm arbor;
wherein the spring has a first end coupled to the arm and a second end coupled to the cap and is positioned to radially expand into contact with the protrusion of the bushing as the arm is rotated in a direction opposite the direction of tensioning engagement such that the bushing is urged radially outward relative to the arm arbor to provide frictional damping;
wherein the slot of the arm arbor is positioned about 30 degree from the spring abutment feature of the cap, and the spring support of the arm arbor is positioned at or between 90 degree through 180 degrees from the spring abutment feature of the cap, thereby providing damping of about 60 in-lb to about 80 in-lb with a tensioner torque of between about 150 in-lb to about 200 in-lb.

2. The tensioner of claim 1, wherein the bushing comprises a sleeve that includes the slit and the protrusion and comprises a flange extending outward from one end of the sleeve.

3. The tensioner of claim 2 wherein the sleeve of the bushing is substantially cylindrical.

4. The tensioner of claim 2 wherein the arm arbor has a fixed diameter.

5. The tensioner of claim 1 wherein the arm includes a pulley rotatably mounted about a second axis, the second axis being spaced from and parallel to the first axis.

6. The tensioner of claim 1 further comprising a support member housing the spring, the arm arbor, and the bushing with the bushing adjacent the support member and the arm arbor between the spring and the bushing.

7. The tensioner of claim 6 wherein the radial expansion of the spring urges the first and second parts of the protrusion into frictional engagement with the slot and urges the bushing into frictional engagement with the support member to provide the frictional damping.

8. The tensioner of claim 6 wherein the support member is stationary and includes a shaft that defines the first axis, wherein the arm is rotatably mounted to the shaft.

9. The tensioner of claim 1 wherein the spring support is at a position at or between 90 degrees and 105 degrees from the spring abutment feature.

10. A tensioner comprising:

a support member comprising a shaft defining a first axis;

an arm comprising an arm arbor mounted on said shaft for rotatable movement of the arm about the first axis, the arm arbor defining a cavity and having a slot open into the cavity;

a bushing having a protrusion receivable in the slot of the arm arbor, wherein the bushing is between the support member and the arm with the protrusion received in the slot, and wherein the bushing includes a longitudinal slit that allows radial expansion and splits the protrusion into a first part and a second part;

a spring received in the cavity of the arm arbor and coupled to the arm urging the arm to rotate about the first axis into tensioning engagement with a power transmitting element, the spring being positioned to radially expand into contact with the protrusion of the bushing as the arm is rotated in a direction opposite the direction of tensioning engagement such that the first and second parts of the protrusion are urged into frictional engagement with the slot, and the bushing is urged radially outward relative to the arm arbor into frictional engagement with the support member to provide frictional damping;

a cap having the spring coupled thereto;

wherein the cap includes a spring abutment feature and the slot of the arm arbor is positioned about 30 degree therefrom, wherein the arm arbor further comprises a spring support positioned to contact the spring when it radially expands and positioned at or between 90 degrees through 135 degrees from the spring abutment feature, thereby providing damping of about 60 in-lb to about 70 in-lb with a tensioner torque of about 175 in-lb to about 200 in-lb.

11. The tensioner of claim 10 wherein the bushing comprises a substantially cylindrical sleeve that includes the slit and the protrusion and comprises a flange extending outward from one end of the sleeve.

12. The tensioner of claim 10 wherein the arm arbor has a fixed diameter.

13. The tensioner of claim 10 wherein the arm includes a pulley rotatably mounted about a second axis, the second axis being spaced from and parallel to the first axis.

14. The tensioner of claim 10 wherein the arm arbor comprises a generally cylindrical sleeve having an open first end and a partial bottom that defines an open second end that has a smaller opening compared to the first end.

15. The tensioner of claim 14 wherein the slot extends through the sleeve and into the partial bottom.

16. The tensioner of claim 10 wherein the spring support is at a position at or between 90 degrees and 105 degrees from the spring abutment feature.

\* \* \* \* \*